US011182635B2

(12) United States Patent
Odate et al.

(10) Patent No.: US 11,182,635 B2
(45) Date of Patent: Nov. 23, 2021

(54) TERMINAL APPARATUS, CHARACTER RECOGNITION SYSTEM, AND CHARACTER RECOGNITION METHOD

(71) Applicant: Hitachi, Ltd., Tokyo (JP)

(72) Inventors: Ryosuke Odate, Tokyo (JP); Hiroshi Shinjo, Tokyo (JP); Yuuichi Nonaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/812,692

(22) Filed: Mar. 9, 2020

(65) Prior Publication Data

US 2020/0387733 A1    Dec. 10, 2020

(30) Foreign Application Priority Data

Jun. 5, 2019  (JP) .............................. JP2019-105432

(51) Int. Cl.
  *G06K 7/10*  (2006.01)
  *G06K 9/46*  (2006.01)
  *G06K 9/34*  (2006.01)

(52) U.S. Cl.
  CPC ............... *G06K 9/46* (2013.01); *G06K 9/344* (2013.01); *G06K 2209/01* (2013.01)

(58) Field of Classification Search
  CPC ....... G06K 9/46; G06K 9/344; G06K 2209/01
  See application file for complete search history.

(56) References Cited

U.S. PATENT DOCUMENTS

| 7,933,447 | B2* | 4/2011 | Yamazaki | ............ | H04N 1/4446 |
| | | | | | 382/173 |
| 8,233,193 | B2* | 7/2012 | Shiitani | ............... | G06F 21/84 |
| | | | | | 358/2.1 |
| 8,984,404 | B2* | 3/2015 | Kompalli | ............ | G06F 3/04883 |
| | | | | | 715/709 |
| 9,158,833 | B2* | 10/2015 | Urbschat | ............ | G06K 9/00469 |
| 9,473,669 | B2* | 10/2016 | Saka | ........................ | H04N 1/41 |
| 10,410,016 | B1* | 9/2019 | Damick | .............. | G06F 21/6209 |

(Continued)

FOREIGN PATENT DOCUMENTS

CN     112149679 A  * 12/2020
JP    2016021088 A    2/2016

OTHER PUBLICATIONS

Dynamic masking of application displays using OCR, S. Porat et al., IBM, 0018-8646, 2009, pp. 10:1 to 10:14 (Year: 2009).*

*Primary Examiner* — Jayesh A Patel
(74) *Attorney, Agent, or Firm* — Mattingly & Malur, PC

(57) ABSTRACT

A personal information separation unit separates a document image containing personal information into a personal information image containing the personal information and a general information image that does not contain the personal information on the basis of the document image, and transmits the general information image to a cloud server. A recognition result integration unit receives a general recognition result that is the recognition result of the character recognition processing for the general information image from the cloud server, and acquires a target recognition result that is the recognition result of the character recognition processing for the document image in accordance with the general recognition result and the information based on the personal information image.

9 Claims, 13 Drawing Sheets

(56) References Cited

U.S. PATENT DOCUMENTS

| | | | |
|---|---|---|---|
| 10,482,280 B2 * | 11/2019 | Abi Antoun | H04L 63/1408 |
| 2008/0002911 A1 * | 1/2008 | Eisen | G06F 40/166 |
| | | | 382/283 |
| 2012/0033892 A1 * | 2/2012 | Blenkhorn | G06K 9/00449 |
| | | | 382/218 |
| 2014/0111834 A1 * | 4/2014 | Fallon | G06F 21/608 |
| | | | 358/474 |
| 2015/0312440 A1 * | 10/2015 | Dolev | H04N 1/32133 |
| | | | 358/1.14 |
| 2016/0014296 A1 | 1/2016 | Saka | |
| 2016/0307034 A1 * | 10/2016 | Goyal | G06Q 50/12 |
| 2017/0091544 A1 * | 3/2017 | Adachi | G06K 9/00463 |
| 2020/0097713 A1 * | 3/2020 | Cramer | G06K 9/00449 |

\* cited by examiner

Invoice

_111b_

Mr. Taro Tokyo, OO Co., Ltd.

Invoice code 98765

ΔΔ Co., Ltd.

Zip code 100-0000

YYY XXX-ku Tokyo

_111a_

Amount claimed 47,000 yen

| Item | Number | Price |
|---|---|---|
| AAA | 10 | 40,000 |
| BBB | 2 | 5,000 |
| CCC | 2 | 2,000 |
|  |  |  |
|  |  |  |
| Total | | 47,000 yen |

Remarks

Please burden bank transfer fee at your expense.

Transfer destination

VVV bank WWW branch Savings account 123456

Invoice

ΔΔ Co., Ltd.
Zip code 100-0000
YYY XXX-ku Tokyo

Invoice code 98765

Amount claimed 47,000 yen

| Item | Number | Price |
|---|---|---|
| AAA | 10 | 40,000 |
| BBB | 2 | 5,000 |
| CCC | 2 | 2,000 |
|  |  |  |
|  |  |  |
|  | Total | 47,000 yen |

Remarks
Please burden bank transfer fee at your expense.

Transfer destination
VVV bank WWW branch Savings account 123456

Mr. Taro Tokyo, OO Co., Ltd.

FIG. 3

700 Item layout definition information

| Item name | Item-entered coordinates | Personal information flag |
|---|---|---|
| Price | (x1, y1), (x'1, y'1) | X |
| Name | (x2, y2), (x'2, y'2) | O |
| Transfer destination | (x3, y3), (x'3, y'3) | X |
| Date | (x4, y4), (x'4, y'4) | X |

Invoice

Mr. Taro Tokyo, OO Co., Ltd.

Invoice code 98765

ΔΔ Co., Ltd.

Zip code 100-0000

YYY XXX-ku Tokyo

Amount claimed 47,000 yen

| Item | Number | Price |
|---|---|---|
| AAA | 10 | 40,000 |
| BBB | 2 | 5,000 |
| CCC | 2 | 2,000 |
|  |  |  |
|  |  |  |
| Total | | 47,000 yen |

Remarks

Please burden bank transfer fee at your expense.

Transfer destination

VVV bank WWW branch Savings account 123456

801

121 Item location information

| Image number (901) | Item number (902) | Item name (903) | Character string coordinates (904) | Image name after separation (905) |
|---|---|---|---|---|
| 1 | 1 | Price | (x1_1, y1_1), (x'1_1, y'1_1) | 1_1.png |
| | 2 | Name | (x1_2, y1_2), (x'1_2, y'1_2) | 1_2.png |
| | 3 | Transfer destination | (x1_3, y1_3), (x'1_3, y'1_3) | 1_1.png |
| | 4 | Date | (x1_4, y1_4), (x'1_4, y'1_4) | 1_1.png |
| | ⋮ | | ⋮ | ⋮ |
| 2 | 1 | Price | (x2_1, y2_1), (x'2_1, y'2_1) | 2_1.png |
| | 2 | Name | (x2_2, y2_2), (x'2_2, y'2_2) | 2_2.png |
| | 3 | Transfer destination | (x2_3, y2_3), (x'2_3, y'2_3) | 2_1.png |
| | 4 | Date | (x2_4, y2_4), (x'2_4, y'2_4) | 2_1.png |
| | ⋮ | | ⋮ | ⋮ |
| ⋮ | ⋮ | | ⋮ | ⋮ |

FIG. 9

122 Information for restoration

| Image name after separation | Character order number for restoration | Image name after editing |
|---|---|---|
| 1_2.png | 1 | 1_2_1.png |
| | 2 | 1_2_2.png |
| | 3 | 1_2_3.png |
| | 4 | 1_2_4.png |
| | ⋮ | ⋮ |
| 2_2.png | 1 | 2_2_1.png |
| | 2 | 2_2_2.png |
| | 3 | 2_2_3.png |
| | 4 | 2_2_4.png |
| | ⋮ | ⋮ |
| ⋮ | ⋮ | ⋮ |

FIG. 11

TERMINAL APPARATUS, CHARACTER RECOGNITION SYSTEM, AND CHARACTER RECOGNITION METHOD

CROSS-REFERENCE TO RELATED APPLICATION

The present application claims priority from Japanese application JP2019-105432, filed on Jun. 5, 2019, the contents of which is hereby incorporated by reference into this application.

BACKGROUND

This disclosure relates to a terminal apparatus, a character recognition system, and a character recognition method.

Due to the spread of machine learning technology, the automation of operations that have been performed by people is progressing. For example, the operation of reading a document entered in an image has been automated by utilizing character recognition processing using the machine learning technology.

In general, a computer with high computing performance including a GPU (Graphics Processing Unit) and the like is necessary in order to perform the character recognition processing using machine learning. However, in many cases, it is difficult to introduce a computer with high computing performance in terms of cost. Therefore, a character recognition system in which a low-cost edge terminal is introduced so that a document image acquired at the edge terminal is transmitted to a cloud server with high computing performance and the character recognition processing is performed on the cloud server has been considered.

For example, Japanese Patent Application Laid-open No. 2016-21088 discloses an electronic document generation system including a first apparatus, and a second apparatus having higher computing performance than the first apparatus. In the electronic document generation system, the first apparatus extracts image data of an area in which characters are entered from the document image and transmits the image data to the second apparatus, and the second apparatus performs character recognition processing for the image data.

SUMMARY

The technology described in Japanese Patent Application Laid-open No. 2016-21088 does not take security relating to secret information such as personal information into consideration. Therefore, when secret information such as personal information is entered in the document image, the image data in which the secret information is entered is directly transmitted to the second apparatus. Thus, there has been a problem in that the risk of the secret information leaking increases.

An object of this disclosure is to provide a terminal apparatus, a character recognition system, and a character recognition method enabling highly-accurate character recognition processing to be performed at low cost and capable of reducing the risk of secret information leaking.

A terminal apparatus according to one aspect of this disclosure is a terminal apparatus coupled to a character recognition processing apparatus, the character recognition processing apparatus configured to perform character recognition processing on an image and transmit a recognition result of the character recognition processing, the terminal apparatus including: a separation unit configured to separate the target image containing secret information into a secret information image containing the secret information and a general information image that does not contain the secret information on basis of the target image, and transmit the general information image to the character recognition processing apparatus; and an integration unit configured to receive a general recognition result that is a recognition result of the character recognition processing for the general information image from the character recognition processing apparatus, and acquire a target recognition result that is a recognition result of the character recognition processing for the target image in accordance with the general recognition result and information based on the secret information image.

According to the present invention, the highly-accurate character recognition processing can be performed at low cost and the risk of the secret information leaking can be reduced.

BRIEF DESCRIPTION OF THE DRAWINGS

FIG. 2 illustrates one example of a document image;

FIG. 3 illustrates a general information image and a personal information image;

FIG. 7 shows one example of item layout definition information;

FIG. 9 shows one example of item location information;

FIG. 11 shows one example of information for restoration;

DETAILED DESCRIPTION OF THE EMBODIMENT

Figure 1:
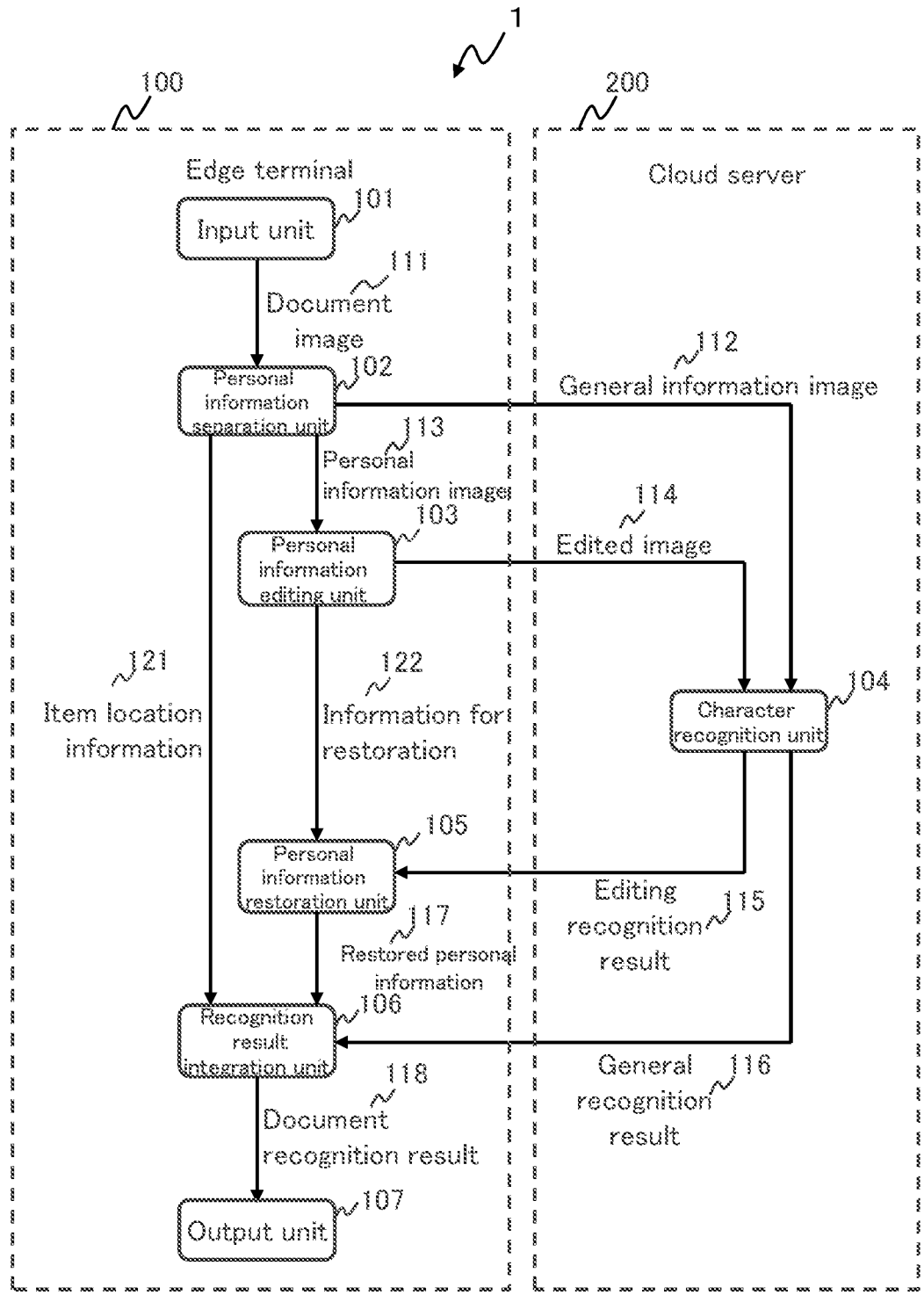
FIG. 1 illustrates a character recognition system according to an embodiment of this disclosure.

An embodiment of this disclosure is described below with reference to the drawings. Elements with the same functions may be denoted by the same reference characters and the description thereof may be omitted below.

FIG. 1 illustrates a character recognition system according to Embodiment 1 of this disclosure. A character recognition system 1 illustrated in FIG. 1 is a system that performs processing for performing character recognition of an image (image data) in which characters are entered by sharing the processing by a plurality of computers, and includes an edge terminal 100 and a cloud server 200. The edge terminal 100 and the cloud server 200 are computers, for example. The edge terminal 100 and the cloud server 200 are coupled to each other over a communication network (not shown). The communication network includes a LAN (Local Area Network) and the internet. The coupling state of the edge terminal 100 and the cloud server 200 with respect to the communication network may be wired coupling or wireless coupling. A security technology such as encryption may be applied to the communication between the edge terminal 100 and the cloud server 200 over the communication network.

The edge terminal 100 is a terminal apparatus that transmits an image containing characters to the cloud server 200 and receives the recognition result of the character recognition processing from the cloud server 200. The cloud server 200 is a character recognition processing apparatus that performs the character recognition processing on the image transmitted from the edge terminal 100 and transmits the recognition result of the character recognition processing to the edge terminal 100.

Specifically, the edge terminal 100 includes an input unit 101, a personal information separation unit 102, a personal information editing unit 103, a personal information restoration unit 105, a recognition result integration unit 106, and an output unit 107. Specifically, the cloud server 200 includes a character recognition unit 104.

The input unit 101 reads a document image 111 serving as a target image on which the character recognition processing is to be performed, and outputs the document image 111. The document image 111 may be an image acquired by an input apparatus 502 (see FIG. 5) or may be an image stored in a secondary storage apparatus 505 (see FIG. 5) or an external storage apparatus (not shown). The document image 111 may be a plurality of images.

Secret information that is information to be kept secret from a third person is entered in the document image 111. In this embodiment, the secret information is personal information relating to an individual such as a creator of the document shown in the document image 111, but the secret information is not limited to personal information. In this embodiment, item contents that are information corresponding to one of a plurality of predefined items are entered in the document image 111, and personal information is entered in at least one of the item contents.

FIG. 2 illustrates one example of the document image 111. The document image 111 illustrated in FIG. 2 is an image showing an invoice. In the document image 111, items such as "price", "name", and "transfer destination" are defined, and item contents 111a to 111c corresponding to those items are entered. Personal information such as "Mr. Taro Tokyo, OO Co., Ltd." is entered in the item contents 111b corresponding to the item "name". In FIG. 2, the document image 111 shows an invoice, but the document shown in the document image 111 is not limited to an invoice.

The description returns to FIG. 1. The personal information separation unit 102 is a separation unit that executes personal information separation processing for separating the document image 111 from the input unit 101 into a general information image 112 that does not contain personal information, and a personal information image 113 containing personal information.

Specifically, the personal information separation unit 102 specifies a personal information entering area in the document image 111 in which the personal information is entered on the basis of the document image 111, generates the image showing the personal information entering area as the personal information image 113 that is secret image information containing secret information, and generates an image obtained by cutting out the personal information entering area from the document image 111 as the general information image 112 that does not contain secret information. The personal information separation unit 102 outputs the personal information image 113 to the personal information editing unit 103, and transmits the general information image 112 to the cloud server 200. The personal information separation unit 102 generates item location information 121 indicating the location of the personal information entering area in the document image 111 and outputs the item location information 121 to the recognition result integration unit 106. A more detailed description of the personal information separation processing performed by the personal information separation unit 102 is described below with reference to FIG. 6.

FIG. 3 illustrates one example of the general information image 112 and the personal information image 113. In the example of FIG. 3, the general information image 112 is an image obtained by cutting out the area in which the item contents 111b corresponding to the item "name" is entered from the document image 111 as the personal information entering area. The personal information image 113 is an image showing the area in which the item contents 111b are entered as the personal information entering area.

The description returns to FIG. 1. The personal information editing unit 103 is an editing unit that executes personal information editing processing for generating an edited image 114 obtained by editing the personal information image 113 output from the personal information separation unit 102 and transmitting the edited image 114 to the cloud server 200. The personal information editing unit 103 generates information for restoration 122 for restoring the personal information and outputs the information for restoration 122 to the personal information restoration unit 105 in the personal information editing processing.

In this embodiment, the editing of the personal information image includes separating the personal information image to a plurality of character images indicating a plurality of characters contained in the personal information image. At this time, the personal information editing unit 103 may manage the plurality of character images by arranging the plurality of character images in a random order. For example, the personal information editing unit 103 may transmit the plurality of character images to the cloud server 200 in a random order. The personal information editing unit 103 may configure file names of the plurality of character images by random character strings.

Figure 4:
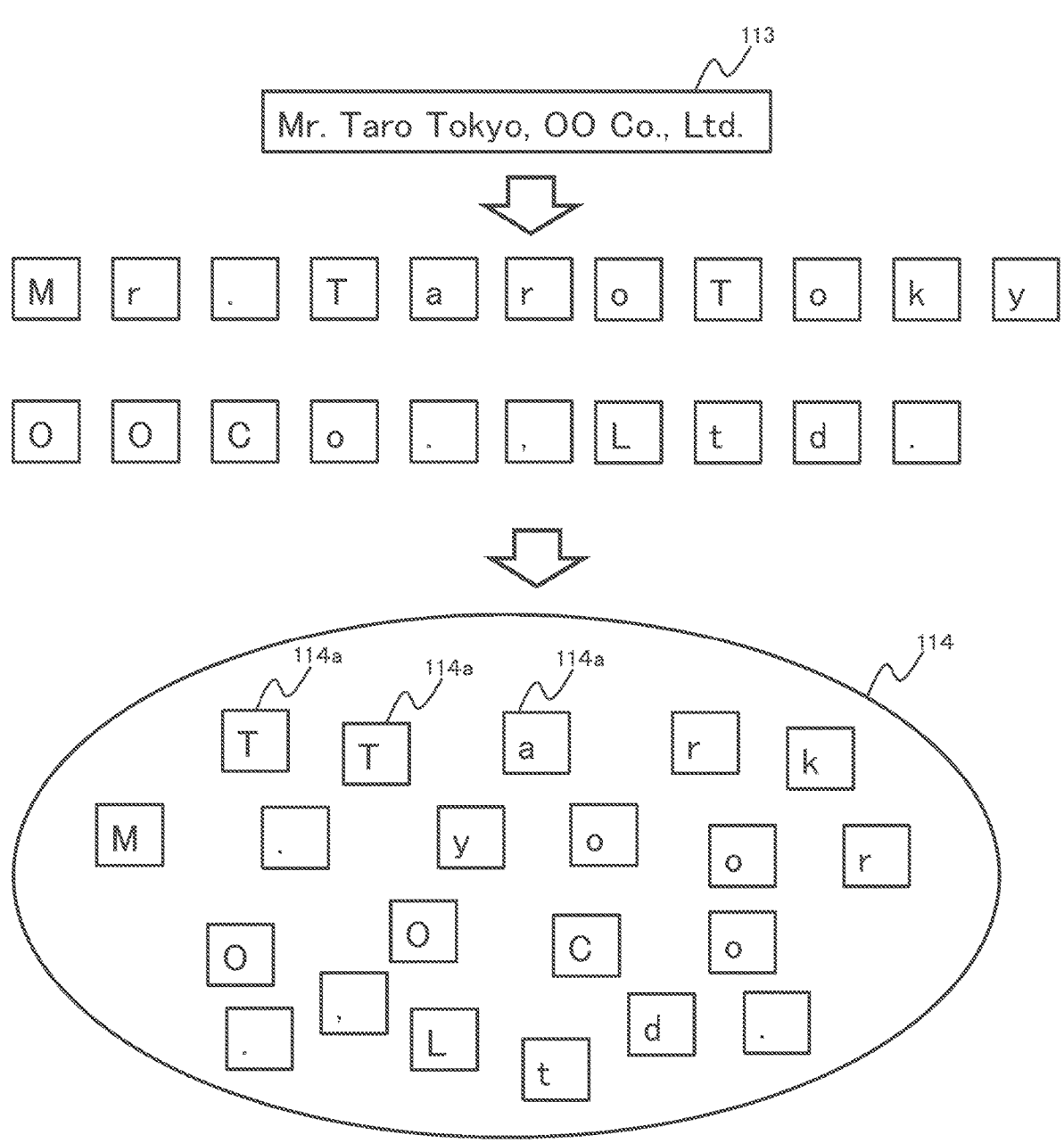
FIG. 4 illustrates one example of an edited image.

FIG. 4 illustrates one example of the edited image 114. In FIG. 4, a plurality of character images 114a showing the characters contained in the personal information image 113 illustrated in FIG. 3 are illustrated as the edited image 114, and the character images 114a are managed in a random order.

The description returns to FIG. 1. The character recognition unit 104 of the cloud server 200 receives the general information image 112 and the edited image 114 from the edge terminal 100, and separately executes the character recognition processing for the general information image 112 and the edited image 114. Then, the character recognition unit 104 transmits the recognition result of the character recognition processing for the general information image 112 to the edge terminal 100 as a general recognition result 116, and transmits the recognition result of the character recognition processing for the edited image 114 to the edge terminal 100 as an editing recognition result 115.

The character recognition processing includes main processing for actually recognizing the characters, preprocessing performed before the main processing, and postprocessing performed after the main processing. The preprocessing is processing of binarizing the images (the general information image 112 and the edited image 114) for recognizing the characters and processing of removing lines such as the enclosing lines in the image, for example. The postprocessing is processing for restoring the lines removed in the preprocessing into the processing result of the main processing, for example.

The specific method of the character recognition processing is not particularly limited, but the character recognition processing using the machine learning and the like described in "Chris Tensmeyer and Tony Martinez, "Document Image Binarization with Fully Convolutional Neural Networks", Proceedings of ICDAR 2017, pp. 99-104, 2017.", for example can be used. The character recognition processing does not necessarily need to use machine learning.

The personal information restoration unit 105 of the edge terminal 100 is a restoration unit that executes personal information restoration processing for acquiring the secret recognition result of the recognition result of the character recognition processing for the personal information image 113 and outputting the secret recognition result as restored personal information 117 on the basis of the editing recognition result 115 from the character recognition unit 104 and the information for restoration 122 from the personal information editing unit 103. The detailed description of the personal information restoration processing performed by the personal information restoration unit 105 is described below with reference to FIG. 12.

The recognition result integration unit 106 is an integration unit that executes integration processing for generating a target recognition result that is the recognition result of the character recognition processing for the original document image 111 and outputting the target recognition result as a document recognition result 118 on the basis of the item location information 121 from the personal information separation unit 102, the general recognition result 116 from the character recognition unit 104, and the restored personal information 117 from the personal information restoration unit 105. The detailed description of the integration processing performed by the recognition result integration unit 106 is described below with reference to FIG. 13.

The output unit 107 outputs the document recognition result 118 from the recognition result integration unit 106.

Figure 5:
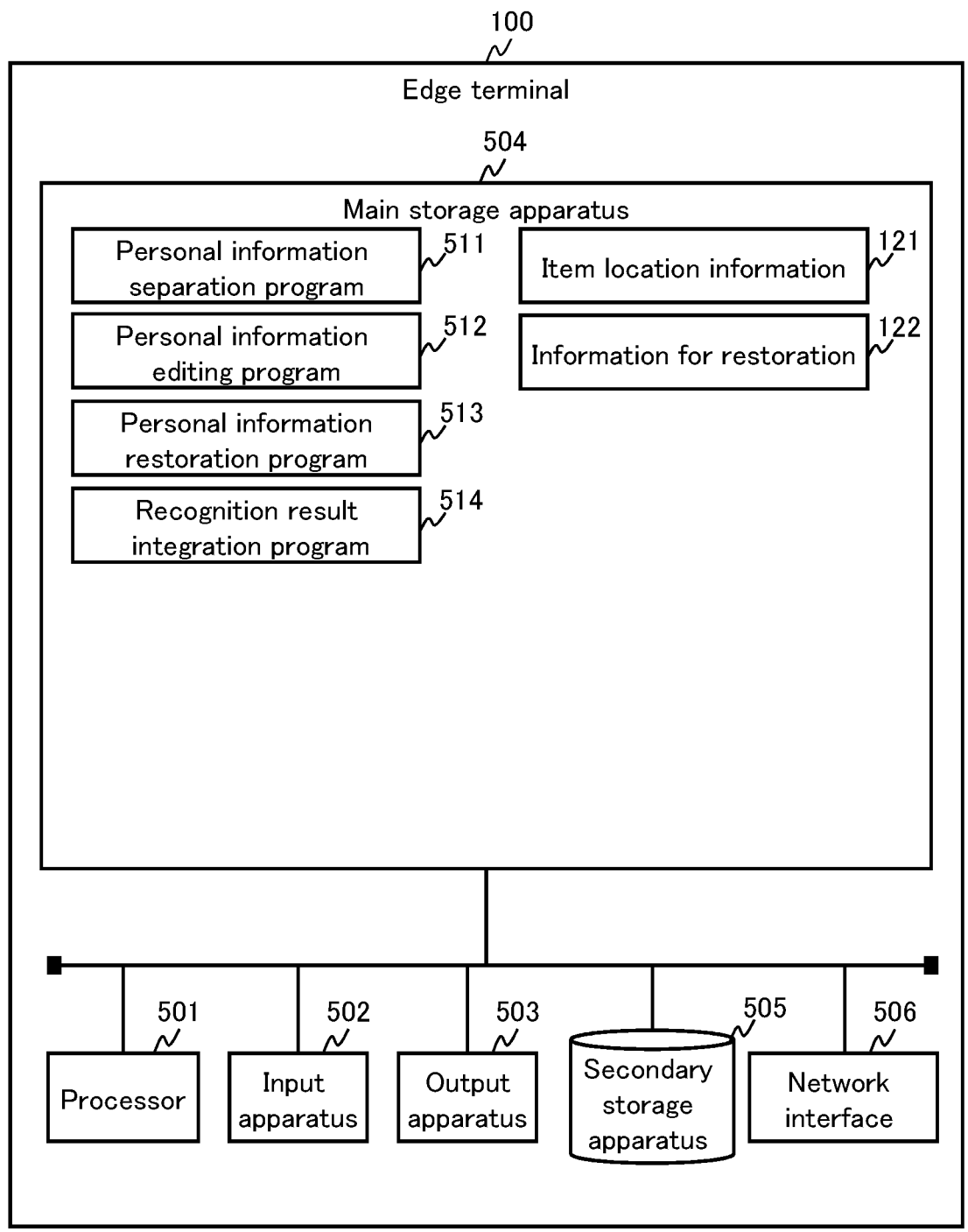
FIG. 5 illustrates hardware configurations of an edge terminal.

FIG. 5 illustrates hardware configurations of the edge terminal 100. The edge terminal 100 illustrated in FIG. 5 includes a processor 501, an input apparatus 502, an output apparatus 503, a main storage apparatus 504, a secondary storage apparatus 505, and a network interface 506 as the hardware configurations. The hardware configurations 501 to 506 are coupled to each other over an internal bus, for example. One configuration is illustrated for each of the hardware configurations 501 to 506 in FIG. 5, but a plurality of configurations may be used. Some functions of the edge terminal 100 may be shared by other computers and storage apparatuses coupled to the edge terminal 100 in a direct manner or over the communication network.

The processor 501 reads programs stored in the main storage apparatus 504, and realizes the input unit 101, the personal information separation unit 102, the personal information editing unit 103, the personal information restoration unit 105, the recognition result integration unit 106, and the output unit 107 illustrated in FIG. 1 by executing the read programs.

The input apparatus 502 is an apparatus for inputting data to the edge terminal 100. The input apparatus 502 includes a device for operating a computer such as a keyboard, a mouse, and a touch panel, and a device for acquiring image data such as a scanner, a digital camera, and a smartphone.

The output apparatus 503 is an apparatus that outputs an input screen for inputting data and various information such as the processing result. The output apparatus 503 includes a touch panel and a display, for example.

The main storage apparatus 504 stores therein a program that regulates the operation of the processor 501, information used by the processor 501 when the program is executed, and the like. The main storage apparatus 504 includes a work area temporarily used by the program. The main storage apparatus 504 includes a memory, for example.

In this embodiment, the main storage apparatus 504 stores therein a personal information separation program 511, a personal information editing program 512, a personal information restoration program 513, and a recognition result integration program 514 as programs that regulate the operation of the processor 501. The personal information separation program 511, the personal information editing program 512, the personal information restoration program 513, and the recognition result integration program 514 correspond to the personal information separation unit 102, the personal information editing unit 103, the personal information restoration unit 105, and the recognition result integration unit 106 illustrated in FIG. 1, and are executed by the processor 501, to thereby realize the correspond configurations. The main storage apparatus 504 stores the item location information 121 and the information for restoration 122 therein.

The secondary storage apparatus 505 stores data therein. The secondary storage apparatus 505 is an HDD (Hard Disk Drive) and an SSD (Solid State Drive), for example. Note that at least some of the programs and information stored in the main storage apparatus 504 may be stored in the secondary storage apparatus 505. In this case, the processor 501 reads programs and information from the secondary storage apparatus 505 and loads the programs and information to the main storage apparatus 504, to thereby use the programs and information.

Figure 6:
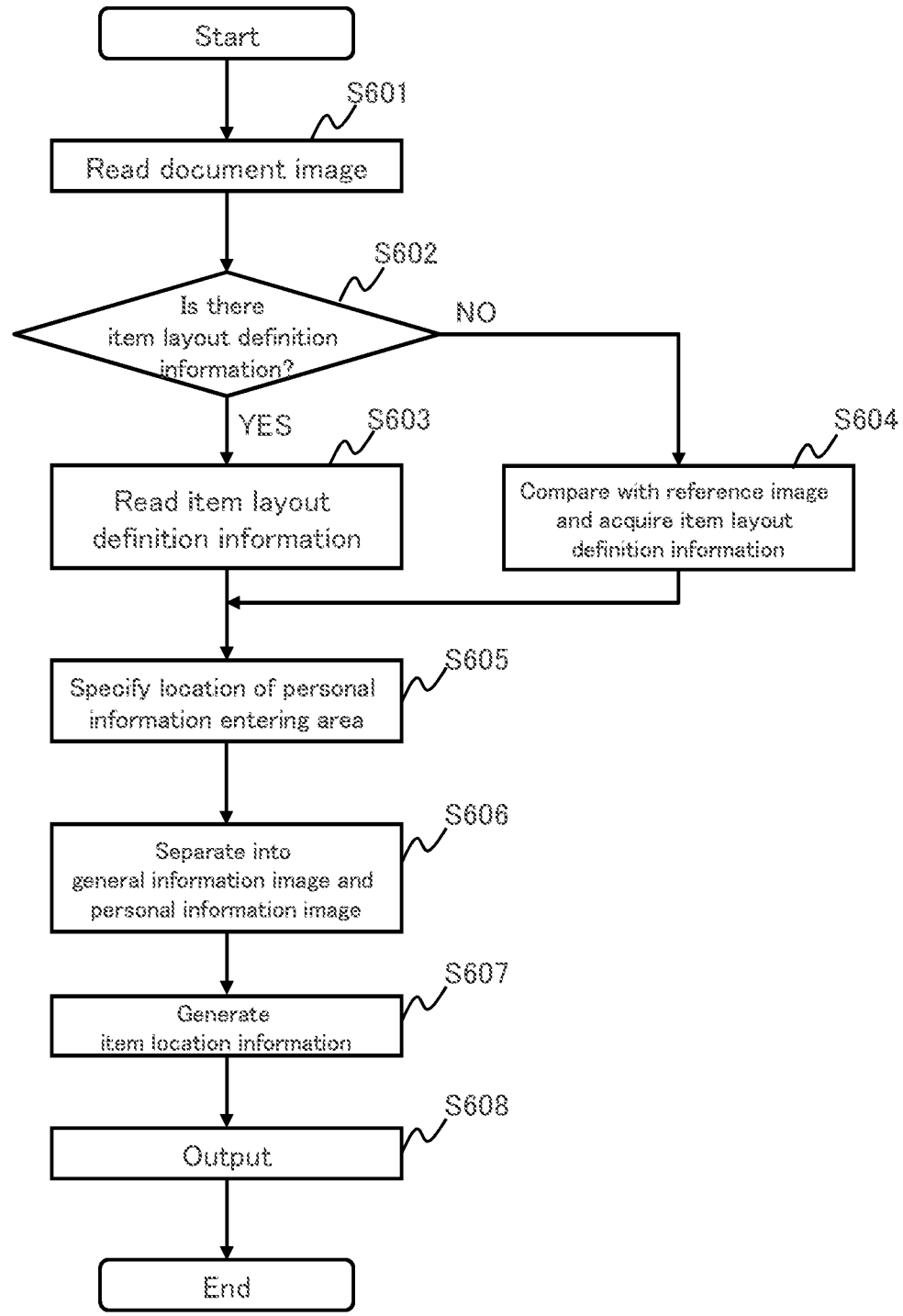
FIG. 6 is a flowchart for illustrating one example of personal information separation processing executed by a personal information separation unit.

FIG. 6 is a flowchart for illustrating one example of the personal information separation processing executed by the personal information separation unit 102 of the edge terminal 100.

In Step S601, the personal information separation unit 102 reads the document image 111 from the input unit 101.

In Step S602, the personal information separation unit 102 checks whether item layout definition information that is definition information indicating the location of the personal information entering area in the document image 111 in which the personal information is entered is contained in the document image 111. Specifically, the item layout definition information indicates the location of the item area in which the item contents of the item are entered, and a personal information flag indicating whether personal information is contained in the item contents for each item. The item layout definition information may be entered in the document image 111 by being encoded into a predetermined format.

FIG. 7 shows one example of the item layout definition information. Item layout definition information 700 shown in FIG. 7 includes an item name 701, item-entered coordinates 702, and a personal information flag 703. The item name 701 is a field that stores therein item names for identifying the items. The item-entered coordinates 702 are a field that stores therein location information indicating the locations of the item areas in which the item contents of the items identified by the item names are entered. The personal information flag 703 is a field that stores therein personal information flags indicating whether personal information is contained in the item contents.

In this embodiment, the item area has a rectangular shape, and the location information in the item area is expressed by coordinates on the upper left end and the lower right end of the item area. Note that the location information in the item area is not limited to this example, and may be expressed by predetermined coordinates (coordinates on the upper left end and the like) and the size of the item area (vertical and horizontal lengths, the length of the diagonal line, or the like), for example. The item area is not limited to a rectangular shape, and may be other shapes such as a round shape. The personal information flag indicates a "circle mark (◯)" when the item contents contain personal information, and indicates a "cross mark (X)" when the item contents do not contain personal information.

In the example in FIG. 7, the item area in which the item contents with the item "name" corresponding to the personal information flag indicating the "circle mark" is entered is the personal information entering area. Information that is defined as the personal information can be selected by configuring the value of the personal information flag, as appropriate.

Figure 8:
FIG. 8 illustrates one example of an entering format for entering the item layout definition information in the document image.

FIG. 8 illustrates one example of an entering format for entering the item layout definition information in the document image 111. In the example in FIG. 8, the item layout definition information is entered in the document image 111 by being encoded to a barcode 801. In this example, the personal information separation unit 102 checks whether the barcode 801 is entered in the document image 111. When the barcode 801 is entered, the personal information separation unit 102 reads the barcode 801 and checks whether the read barcode 801 indicates the item layout definition information. Note that the entering format of the item layout definition information is not limited to this example. The item layout definition information may be encoded in a format other than a two-dimensional code such as the barcode 801, for example, or may be entered as character information without being encoded.

The description returns to FIG. 6. The personal information separation unit 102 executes the processing of Step S603 when the document image 111 contains the item layout definition information, and executes the processing of Step S604 when the document image 111 does not contain the item layout definition information.

In Step S603, the personal information separation unit 102 reads the item layout definition information from the document image 111, and proceeds to the processing of Step S605.

Meanwhile, in Step S604, the personal information separation unit 102 compares the document image 111 and a reference image with each other and acquires the item layout definition information. The reference image is an image in which the location of the item contents that are entered information is known, and the item layout definition information relating to the reference image, for example, is stored in advance in the main storage apparatus 504, the secondary storage apparatus 505 or so forth. The reference image may be an image showing a template of the document shown by the document image 111 (an invoice and the like).

The specific method for the processing of acquiring the item layout definition information by comparing the document image 111 and the reference image with each other is not particularly limited, but the technology described in "Hiroyuki Naruse et al., "A Structure Recognition Method of Table-Form Documents on the Basis of the Information of Line Segments", The transactions of the Institute of Electronics, Information and Communication Engineers, pp. 1372-1385, 1992." and the like can be applied, for example. The personal information separation unit 102 may perform the character recognition processing for the document image 111, acquire the item contents from the recognition result, and acquire the item layout information from the coordinates of the item contents. In this case, the character recognition processing performed by the personal information separation unit 102 only needs to have an accuracy with which the coordinates of the item contents can be grasped, and hence the accuracy may be lower than that of the character recognition processing performed by the character recognition unit 104 of the cloud server 200.

When Step S603 or S604 ends, the processing proceeds to Step S605. In Step S605, the personal information separation unit 102 specifies the personal information entering area that is the item area in the document image 111 containing the personal information and the location thereof on the basis of the item layout definition information.

In Step S606, the personal information separation unit 102 separates the document image 111 into the general information image 112 and the personal information image 113 on the basis of the specified location of the personal information entering area. Specifically, the personal information separation unit 102 cuts out the personal information entering area in the specified location from the document image 111, generates the image showing the cut out personal information entering area to be the personal information image 113, and generates the remaining image after the personal information entering area is cut out from the document image 111 as the general information image 112.

In Step S607, the personal information separation unit 102 generates the item location information 121 on the basis of the item layout definition information. Specific examples of the item location information 121 are described below with reference to FIG. 9.

In Step S608, the personal information separation unit 102 transmits the general information image 112 to the cloud server 200, outputs the personal information image 113 to the personal information editing unit 103, and outputs the item location information 121 to the recognition result integration unit 106, and thereby end the processing.

FIG. 9 shows one example of the item location information 121 generated by the personal information separation unit 102 in Step S607. The item location information 121 shown in FIG. 9 includes an image number 901, an item number 902, an item name 903, character string coordinates 904, and an image name 905 after separation.

The image number 901 is a field that stores therein the image numbers that are identification information for identifying the document image 111. The item number 902 is a field that stores therein the item numbers that are identification information for identifying the items. The item name 903 is a field that stores the item names therein.

The character string coordinates 904 are a field that stores therein location information indicating the locations of the item areas in which the item contents of the items identified by the item numbers are entered in the document image 111. The image name 905 after separation is a field that stores therein the image names after separation for identifying the images in which the item contents of the items identified by the item numbers are entered out of the images after separation (the general information image 112 and the personal information image 113).

In the example of the drawing, the image name after separation is a file name of the image after separation, and specifically indicates "the original image number_the image number after separation.png". The image number after separation in the image name after separation indicates "1" for the case of the general information image 112, and indicates "2" for the case of the personal information image 113. Therefore, for example, the image name after separation is "1_1.png" for the case of the general information image 112 separated from the document image 111 of which original image number is "1", and is "2_2.png" for the case of the personal information image 113 separated from the document image 111 of which original image number is "2". Note that, although the general information image 112 and the personal information image 113 are images in a PNG format, the general information image 112 and the personal information image 113 may be images in other formats. The general information image 112 and the personal information image 113 may be images in different formats.

Note that the number and types of the fields in the item location information 121 in FIG. 9 are merely examples, and can be changed, as appropriate, if necessary. For example, it is possible to identify the item contents with only one of the item number and the item name, and one of the item number 902 and the item name 903 is not necessarily needed.

Figure 10:
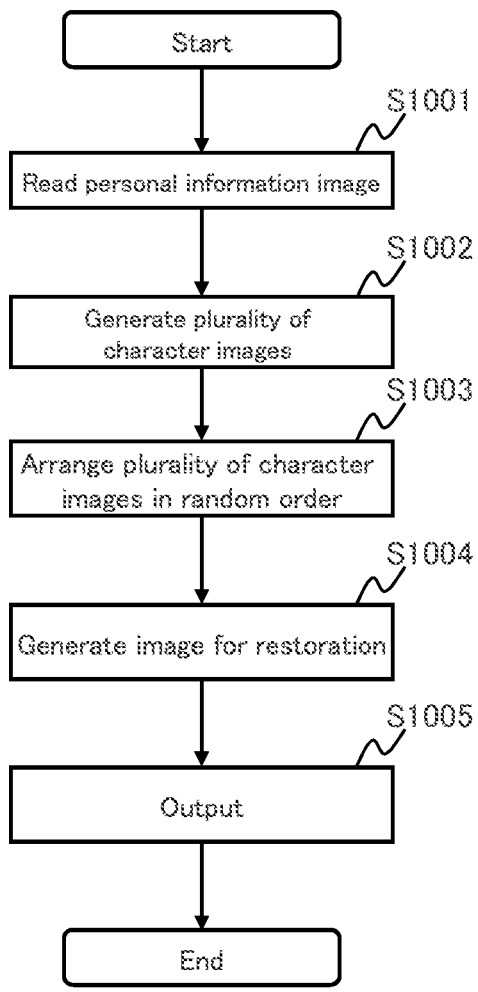
FIG. 10 is a flowchart for illustrating one example of personal information editing processing executed by a personal information editing unit.

FIG. 10 is a flowchart for illustrating one example of the personal information editing processing executed by the personal information editing unit 103 of the edge terminal 100.

In Step S1001, the personal information editing unit 103 reads the personal information image 113 output from the personal information separation unit 102.

In Step S1002, the personal information editing unit 103 generates a plurality of character images showing a plurality of characters contained in the personal information image 113 from the personal information image 113 as the edited image 114.

In Step S1003, the personal information editing unit 103 arranges the plurality of character images in a random order.

In Step S1004, the personal information editing unit 103 generates information indicating the relationship between the personal information image 113 before editing and the plurality of character images after editing as the information for restoration 122.

In Step S1005, the personal information editing unit 103 transmits the plurality of character images to the cloud server 200 in the order arranged in Step S1003, and outputs the information for restoration to the personal information restoration unit 105, to thereby end the processing. Note that the personal information editing unit 103 may successively or intermittently transmit the plurality of character images.

FIG. 11 shows one example of the information for restoration 122 generated by the personal information editing unit 103 in Step S1004. The information for restoration 122 shown in FIG. 11 includes an image name after separation 1101, a character order number 1102 for restoration, and an image name 1103 after editing.

The image name after separation 1101 is a field that stores therein image names after separation for identifying the personal information images 113. The character order number 1102 for restoration is a field that stores therein character order numbers for restoration indicating the arrangement order of the characters shown by the plurality of character images in the personal information image 113. The image name 1103 after editing is a field that stores therein image names after editing for identifying the character images. In the example of the drawing, the image name after editing indicates "the original image number_the image number after separation_the character order number for restoration.png". Therefore, for example, the image name after separation is "1_2_1.png" when the image name after separation indicates the first character contained in the personal information image 113 separated from the document image 111 of which original image number is "1", and is "2_2_3.png" when the image name after separation indicates the third character of the personal information contained in the personal information image 113 separated from the document image 111 of which original image number is "2".

Note that the image name after editing is configured by the personal information editing unit 103. The image name after editing is not limited to the abovementioned example. For example, in the example of FIG. 11, the image name after editing includes the original image number, the image number after separation, and the character order number for restoration, but those numbers do not necessarily need to be included. The image name after editing may be replaced with a character string (including a random number) in which at least one (for example, the character order number for restoration) of those numbers is random, for example. The number and types of the field of the information for restoration 122 can be changed, as appropriate, if necessary.

Figure 12:
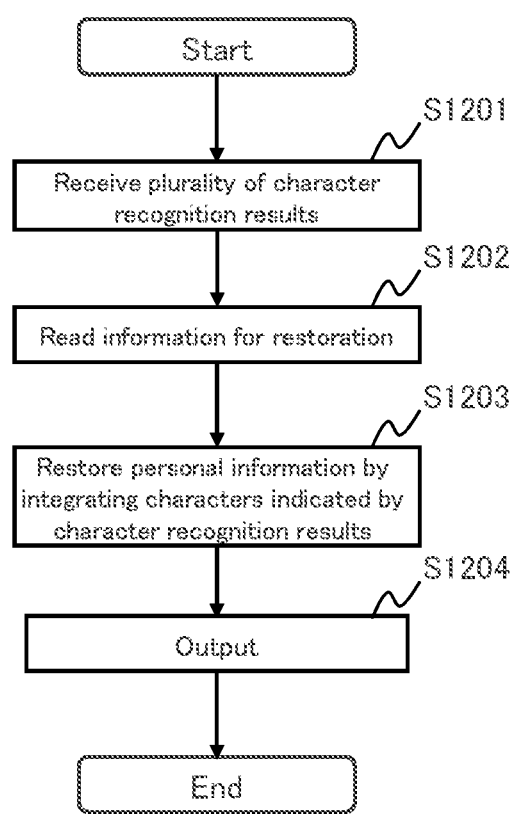
FIG. 12 is a flowchart for illustrating one example of personal information restoration processing executed by a personal information restoration unit.

FIG. 12 is a flowchart for illustrating one example of the personal information restoration processing executed by the personal information restoration unit 105 of the edge terminal 100.

In Step S1201, the personal information restoration unit 105 receives a plurality of character recognition results that are recognition results of the plurality of character images from the cloud server 200 as the editing recognition results 115.

In Step S1202, the personal information restoration unit 105 reads the information for restoration 122 from the personal information editing unit 103.

In Step S1203, the personal information restoration unit 105 acquires the restored personal information 117 by restoring the personal information by arranging and integrating the plurality of characters indicated by the plurality of character recognition results on the basis of the information for restoration 122.

In Step S1204, the personal information restoration unit 105 outputs the restored personal information 117.

Figure 13:
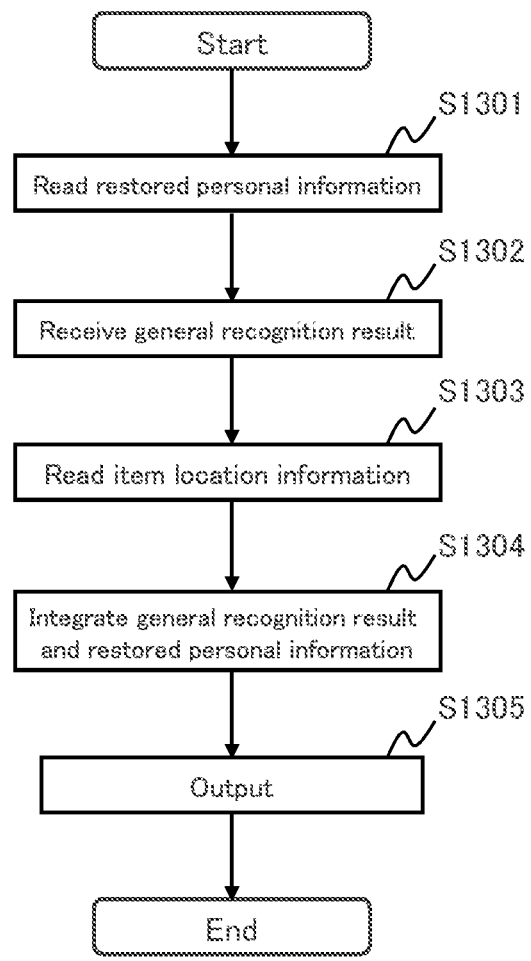
FIG. 13 is a flowchart for illustrating one example of recognition result integration processing executed by a recognition result integration unit.

FIG. 13 is a flowchart for illustrating one example of recognition result integration processing executed by the recognition result integration unit 106 of the edge terminal 100.

In Step S1301, the recognition result integration unit 106 reads the restored personal information 117 from the personal information restoration unit 105.

In Step S1302, the recognition result integration unit 106 receives the general recognition result 116 from the cloud server 200.

In Step S1303, the recognition result integration unit 106 reads the item location information 121 from the personal information separation unit 102.

In Step S1304, the recognition result integration unit 106 acquires the document recognition result 118 as the recognition result of the character recognition processing for the document image 111 by integrating the general recognition result 116 and the restored personal information 117 on the basis of the item location information 121. For example, the recognition result integration unit 106 integrates the general recognition result 116 and the restored personal information 117 by incorporating the restored personal information 117 into the location corresponding to the location of the item area at which the image name after separation indicates the personal information image 113 in the general recognition result 116 on the basis of the item location information 121.

In Step S1305, the recognition result integration unit 106 outputs the document recognition result 118.

The personal information image 113 is edited and transmitted to the cloud server 200 in the abovementioned configurations and operations, but the personal information image 113 does not necessarily need to be transmitted to the cloud server 200. In this case, the recognition result integration unit 106 acquires the document recognition result 118 in accordance with the general recognition result 116 from the cloud server 200 and the information based on the personal information image 113. For example, the recognition result integration unit 106 can acquire the document recognition result 118 by performing the character recognition processing for the personal information image 113 and integrating the recognition result thereof with the general recognition result 116 instead of the restored personal information 117. Note that the character recognition processing in the edge terminal 100 is preferred to be simpler than the character recognition processing performed by the cloud server 200. Also in this case, the information amount (the number of characters and the like) of the information entered in the personal information image 113 is less than the information amount entered in the document image 111, and hence the character recognition processing can be performed with a necessary accuracy. The recognition result integration unit 106 may display the personal information image 113 on the output apparatus 503 and then receive the information entered in the personal information image 113 by the input apparatus 502 from a user of the edge terminal 100 as the character information. In this case, the recognition result integration unit 106 can acquire the document recognition result 118 by integrating the character information with the general recognition result 116.

When the personal information image 113 is not transmitted to the cloud server 200 as above, the editing of the personal information image and the restoration of the personal information do not necessarily need to be performed, and hence the personal information editing unit 103 and the personal information restoration unit 105 are not necessarily needed. In this case, it is possible for the main storage apparatus 504 to store therein only the necessary programs. In other words, the personal information editing program 512, the personal information restoration program 513, and the like are not necessarily needed.

The embodiment described above describes this disclosure in detail, and does not limit this disclosure. For example, not all of the elements and the combinations thereof described in the embodiment are necessarily needed as the solution of this disclosure, and the elements and the combinations thereof can be removed or replaced with other elements, as appropriate.

Some of the abovementioned configurations and functions may be implemented by hardware such as an integrated circuit. Some of the abovementioned configurations and functions may be implemented by a program. In this case, the program is recorded in a storage medium, and a processor included in a computer reads the program recorded in the storage medium. Then, the configurations and functions are implemented by executing the read program. Therefore, the program and a recording medium on which the program is recorded are one embodiment of this disclosure. As the recording medium, for example, a flexible disk, a CD-ROM, a DVD-ROM, a hard disk, an SSD, an optical disk, a magneto-optical disk, a CD-R, a magnetic tape, a nonvolatile memory card, a ROM, and the like are used.

The abovementioned program can be implemented by a programming language or a scripting language such as assembler, C/C++, Perl, Shell, PHP, or Java (registered trademark), for example.

The abovementioned program may be distributed over the communication network. In this case, the distributed program may be stored in storage means such as a hard disk or a memory of a computer or a recording storage medium such as a CD-RW and a CD-R, and the processor included in the computer may execute the program stored in the storage means and the recording medium by reading the programs.

In the abovementioned embodiment, the described control lines and the information lines are control lines and information lines conceived to be necessarily in terms of description, and not all of the control lines and information lines are necessarily described for the product. All of the configurations may be coupled to each other.

As described above, this disclosure includes the following matters.

A terminal apparatus 100 according to one aspect of this disclosure is coupled to a character recognition processing apparatus 200 configured to perform character recognition processing on an image and transmit a recognition result of the character recognition processing. The terminal apparatus 100 includes a separation unit 102 and a recognition result integration unit 106. The separation unit separates a target image containing secret information into a secret information image 113 containing the secret information and a general information image 112 that does not contain the secret information on the basis of the target image 111, and transmits the general information image to the character recognition processing apparatus. The recognition result integration unit receives a general recognition result 116 that is a recognition result of the character recognition processing for the general information image from the character recognition processing apparatus, and acquires a target recognition result 118 that is a recognition result of the character recognition processing for the target image in accordance with the general recognition result and information based on the secret information image.

According to the abovementioned configuration, the general information image that does not contain the secret information separated from the target image is transmitted to the character recognition processing apparatus, and the target recognition result that is the recognition result of the character recognition processing for the target image is acquired in accordance with the general recognition result that is the recognition result of the character recognition processing for the general information image. Therefore, the risk of the secret information leaking can be reduced while using the highly-accurate character recognition processing performed by the character recognition processing apparatus. Therefore, the highly-accurate character recognition processing can be performed at low cost and the risk of the secret information leaking can be reduced.

The terminal apparatus includes an editing unit 103 and a secret information restoration unit 105. The editing unit generates an edited image 114 obtained by editing the secret information image and transmits the edited image 114 to the character recognition processing apparatus. The secret information restoration unit receives an editing recognition result 115 that is a recognition result of the character recognition processing for the edited image from the character recognition processing apparatus, and acquires a secret recognition result 117 that is a recognition result of the character recognition processing for the secret information image on the basis of the editing recognition result. The recognition result integration unit acquires a target recognition result by considering the secret recognition result to be information based on the secret information image.

According to the abovementioned configuration, the edited image obtained by editing the secret information image containing the secret information is transmitted to the character recognition processing apparatus. Therefore, the highly-accurate character recognition processing performed by the character recognition processing apparatus can be also applied to the secret information while reducing the risk of the secret information leaking.

The editing unit generates a plurality of character images 114a showing a plurality of characters contained in the secret information image as an edited image. Therefore, the secret information is separated into a plurality of images, and hence a case where one image containing the entire secret information is transmitted to the character recognition processing apparatus does not occur. Therefore, the risk of the secret information leaking can be further reduced.

The editing unit transmits the plurality of character images to the character recognition processing apparatus in a random order. Therefore, the risk of the secret information leaking can be further reduced.

The editing unit configures file names of the plurality of character images to random character strings. Therefore, the risk of the secret information leaking can be further reduced.

The target image contains definition information 700 indicating a location of an area in the target image in which the secret information is entered. The separation unit reads the definition information from the target image and separates the target image into the secret information image and the general information image on the basis of the read definition information. Therefore, the separation into the secret information image and the general information image can be accurately performed.

The definition information is entered in the target image encoded into a predetermined format. Therefore, the appearance of the target image can be improved and the definition information can be easily read.

The separation unit compares the target image and a reference image in which a location in which information is entered is known with each other, acquires definition information indicating a location of an area in the target image in which the secret information is entered, and separates the target image into the secret information image and the general information image on basis of the acquired definition information. The separation into the secret information image and the general information image can be also performed in the target image that does not contain the definition information, and hence the versatility can be improved.

The embodiment of this disclosure described above is an example for describing this disclosure, and is not intended to limit the scope of this disclosure to the embodiment. A person skilled in the art can carry out the present invention with other various aspects without departing from the scope of the present invention.

What is claimed is:

1. A terminal apparatus coupled to a character recognition processing apparatus, the character recognition processing apparatus configured to perform character recognition processing on a target image and transmit a recognition result of the character recognition processing, the terminal apparatus comprising:
a processor configured to:
separate the target image containing secret information into a secret information image containing the secret information and a general information image that does not contain the secret information on basis of the target image, and transmit the general information image to the character recognition processing apparatus;
receive a general recognition result that is a recognition result of the character recognition processing for the general information image from the character recognition processing apparatus, and acquire a target recognition result that is a recognition result of the character recognition processing for the target image in accordance with the general recognition result and information based on the secret information image;
generate an edited image obtained by editing the secret information image and transmit the edited image to the character recognition processing apparatus; and
receive an editing recognition result that is a recognition result of the character recognition processing for the edited image from the character recognition processing apparatus, and acquire a secret recognition result that is a recognition result of the character recognition processing for the secret information image on basis of the editing recognition result,
wherein the processor acquires the target recognition result by considering the secret recognition result to be information based on the secret information image.

2. The terminal apparatus according to claim 1, wherein the processor is further configured to generate a plurality of character images showing a plurality of characters contained in the secret information image as the edited image.

3. The terminal apparatus according to claim 2, wherein the processor is further configured to transmit the plurality of character images to the character recognition processing apparatus in a random order.

4. The terminal apparatus according to claim 2, wherein the processor is further configured to configure file names of the plurality of character images to random character strings.

5. The terminal apparatus according to claim 1, wherein:
the target image contains definition information indicating a location of an area in the target image in which the secret information is entered; and
the processor is further configured to read the definition information from the target image and separate the target image into the secret information image and the general information image on basis of the read definition information.

6. The terminal apparatus according to claim 5, wherein the definition information is encoded into a predetermined format and is entered in the target image.

7. The terminal apparatus according to claim 1, wherein the processor is further configured to:
compare the target image and a reference image in which a location in which information is entered is known with each other;
acquire definition information indicating a location of an area in the target image in which the secret information is entered; and
separate the target image into the secret information image and the general information image on basis of the acquired definition information.

8. A character recognition system, comprising:
a character recognition processing apparatus configured to perform character recognition processing; and
a terminal apparatus coupled to the character recognition processing apparatus, wherein:
the terminal apparatus comprises a processor configured to:
separate a target image containing secret information into a secret information image containing the secret information and a general information image that does not contain the secret information on basis of the target image, and transmit the general information image to the character recognition processing apparatus;

receive a general recognition result that is a recognition result of the character recognition processing for the general information image from the character recognition processing apparatus, and acquire a target recognition result that is a recognition result of the character recognition processing for the target image in accordance with the general recognition result and information based on the secret information image;

generate an edited image obtained by editing the secret information image and transmit the edited image to the character recognition processing apparatus; and receive an editing recognition result that is a recognition result of the character recognition processing for the edited image from the character recognition processing apparatus, and acquire a secret recognition result that is a recognition result of the character recognition processing for the secret information image on basis of the editing recognition result, wherein the processor acquires the target recognition result by considering the secret recognition result to be information based on the secret information image and wherein the character recognition processing apparatus comprises a processor configured to receive the general information image from the terminal apparatus, perform the character recognition processing for the general information image, and transmit the recognition result of the character recognition processing to the terminal apparatus.

9. A character recognition method performed by a terminal apparatus coupled to a character recognition processing apparatus configured to perform character recognition processing on a target image and transmit a recognition result of the character recognition processing, the character recognition method comprising:

separating the target image containing secret information into a secret information image containing the secret information and a general information image that does not contain the secret information on basis of the target image;

transmitting the general information image to the character recognition processing apparatus;

receiving a general recognition result that is a recognition result of the character recognition processing for the general information image from the character recognition processing apparatus;

generating an edited image obtained by editing the secret information image and transmit the edited image to the character recognition processing apparatus;

receiving an editing recognition result that is a recognition result of the character recognition processing for the edited image from the character recognition processing apparatus, and acquire a secret recognition result that is a recognition result of the character recognition processing for the secret information image on basis of the editing recognition result; and acquiring a target recognition result that is a recognition result of the character recognition processing for the target image in accordance with the general recognition result and information based on the secret information image, wherein the target recognition result is acquired by considering the secret recognition result to be information based on the secret information image.

\* \* \* \* \*